(12) United States Patent
Martinez et al.

(10) Patent No.: US 10,583,585 B2
(45) Date of Patent: *Mar. 10, 2020

(54) METHOD OF MANUFACTURING A SCREEN PROVIDED WITH RETROREFLECTIVE MICROSTRUCTURES

(71) Applicant: Commissariat à l'Énergie Atomique et aux Énergies Alternatives, Paris (FR)

(72) Inventors: Christophe Martinez, Grenoble (FR); Bernard Aventurier, Saint Joseph de Riviere (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 306 days.

This patent is subject to a terminal disclaimer.

(21) Appl. No.: 15/404,684

(22) Filed: Jan. 12, 2017

(65) Prior Publication Data

US 2017/0197338 A1 Jul. 13, 2017

(30) Foreign Application Priority Data

Jan. 12, 2016 (FR) .................................. 16 50226

(51) Int. Cl.
*B29C 33/42* (2006.01)
*B29D 11/00* (2006.01)
(Continued)

(52) U.S. Cl.
CPC ........ *B29C 33/42* (2013.01); *B29D 11/00625* (2013.01); *B29L 2031/30* (2013.01); *B29L 2031/3475* (2013.01); *G02B 5/124* (2013.01)

(58) Field of Classification Search
CPC ... B29C 33/42; B29D 11/00625; G02B 5/124; B29L 2031/30; B29L 2031/3475
See application file for complete search history.

(56) References Cited

U.S. PATENT DOCUMENTS 6,406,638 B1 * 6/2002 Stoeber .................. A61M 5/32
216/11
9,835,860 B2 * 12/2017 Martinez ............. B29C 33/3842
(Continued)

FOREIGN PATENT DOCUMENTS

JP 2011-191404 A 9/2011

OTHER PUBLICATIONS

French Search Report for Application No. FR 1650226 dated Sep. 6, 2016.

*Primary Examiner* — Duy Vu N Deo
(74) *Attorney, Agent, or Firm* — Wolf, Greenfield & Sacks, P.C.

(57) ABSTRACT

A method of manufacturing a primary mold for the forming of a retroreflective screen, the method including the steps of: a) forming, on the front surface of such a substrate, a layer of a material such that the first substrate is selectively etchable over said layer; and b) forming microrecesses from the rear surface of the first substrate by selective etching of the first substrate over said layer, each microrecess emerging on the rear surface of said layer and having a back parallel to the front surface of the first substrate and first and second lateral walls orthogonal to each other and orthogonal to the back the first and second lateral walls and the back of the microrecess joining at a same point and forming a trihedron.

10 Claims, 7 Drawing Sheets

(51) Int. Cl.
*G02B 5/124* (2006.01)
*B29L 31/30* (2006.01)
*B29L 31/34* (2006.01)

(56) References Cited

U.S. PATENT DOCUMENTS 9,939,639 B2 * 4/2018 Martinez ............ B29C 33/3842
2004/0004765 A1 1/2004 Ihara et al.

* cited by examiner

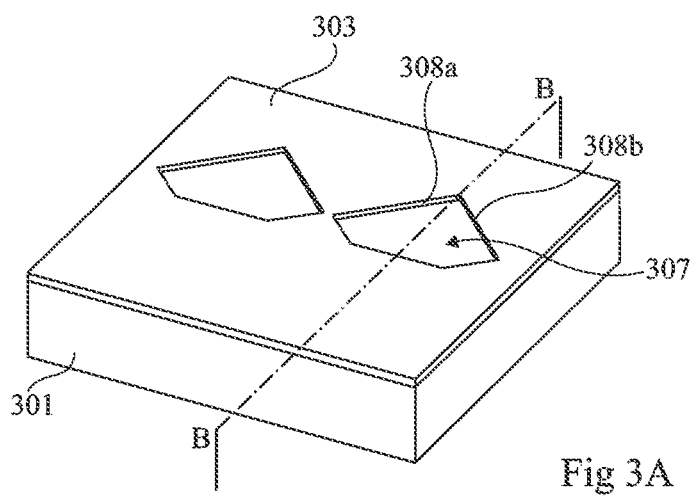
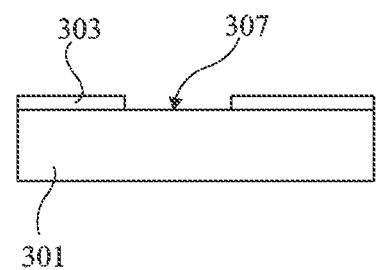
Fig 3A          Fig 3B
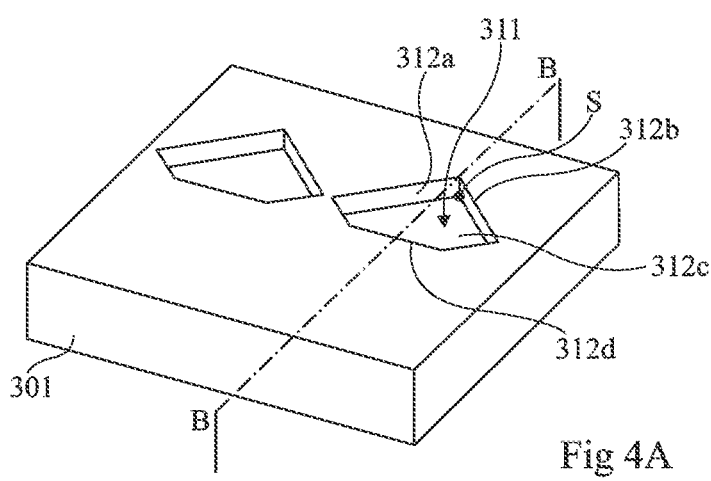
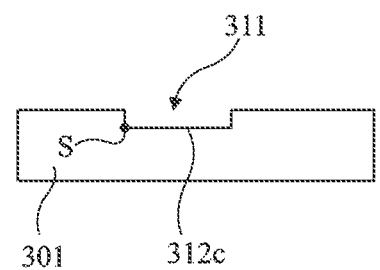
Fig 4A          Fig 4B
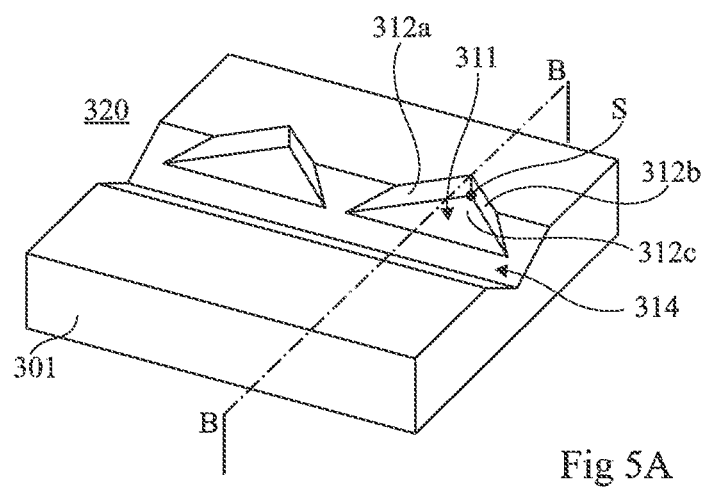
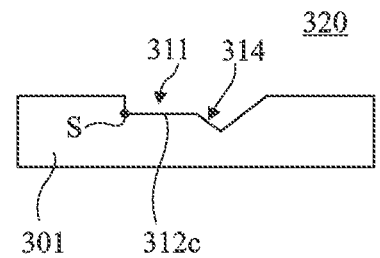
Fig 5A          Fig 5B

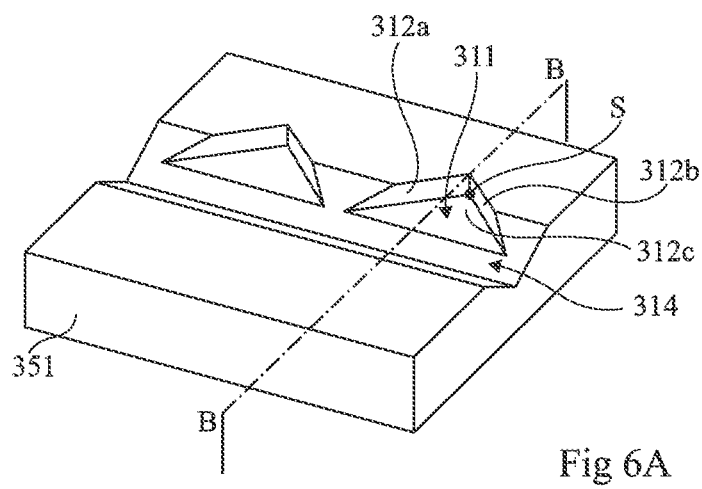
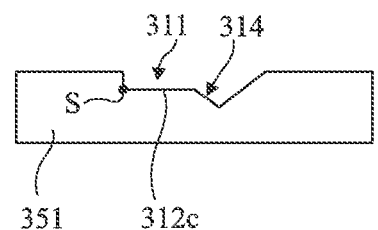
Fig 6A  Fig 6B
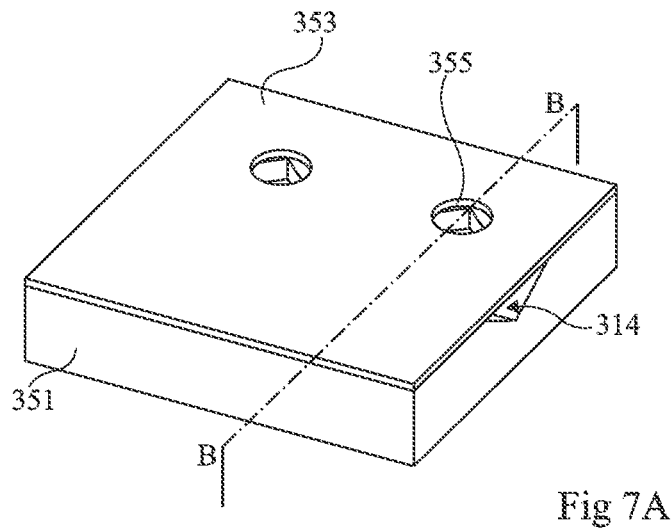
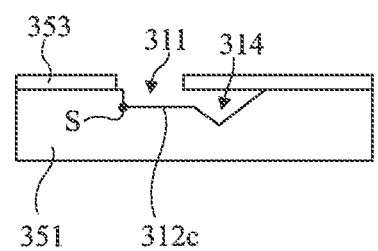
Fig 7A  Fig 7B
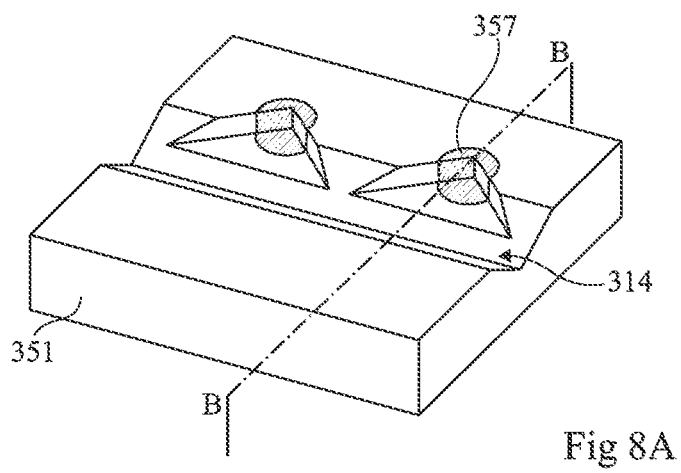
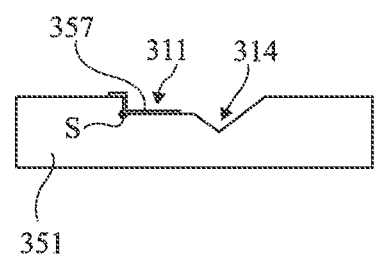
Fig 8A  Fig 8B

METHOD OF MANUFACTURING A SCREEN PROVIDED WITH RETROREFLECTIVE MICROSTRUCTURES

CROSS-REFERENCE TO RELATED APPLICATION

This application claims priority to French patent application number 16/50226, filed Jan. 12, 2016, which is incorporated herein by reference to the maximum extent allowable by law.

BACKGROUND

The present disclosure relates to the field of image display systems on transparent surfaces such as windshields of vehicles, particularly of motor vehicles. It more particularly aims at a screen provided with retroreflective microstructures adapted to such a system, at a method of forming such a screen, and at a mold for forming such a screen.

DISCUSSION OF THE RELATED ART

The applicant has recently provided in French patent application FR3020149 filed on Apr. 16, 2014 as well as in the corresponding international patent application WO2015158999 filed on Apr. 9, 2015, a system of image display on a windshield using a partially transparent and partially retro-reflective screen coating the inner surface of the windshield.

FIG. 1 is a simplified cross-section view of such a system. The system comprises a screen 103 coating the inner surface of a windshield 101, that is, its surface facing the inside of the vehicle, and a projector 105 capable of being mounted on the head of a user 107, for example, the vehicle driver. Projector 105 is capable of projecting an image on all or part of the surface of screen 103 facing the inside of the vehicle (that is, opposite to windshield 101). Screen 103 is partially transparent and partially retroreflective. More particularly, screen 103 is capable of retroreflecting—that is, of reflecting towards its source—light projected on its surface facing the inside of the vehicle, and of giving way with no significant alteration to light originating from windshield 101, that is, from the outside of the vehicle. Screen 103 thus has a transparency function, enabling the user to see the outer scene through windshield 101 from the inside of the vehicle, and a retroreflection function, enabling the user—whose pupils are close to projector 105—to see, overlaid on the outer scene, an image generated by projector 105.

FIG. 2 is a cross-section view showing in further detail screen 103 of the system of FIG. 1.

Screen 103 is formed of a film of a transparent material having an approximately smooth surface 201a and having a surface 201b opposite to surface 201a exhibiting substantially identical protrusions 203 regularly distributed across the film surface. Each protrusion 203 has substantially the shape of a cube corner, that is, of a trihedron comprising three mutually perpendicular triangular lateral surfaces joining at a same point, or summit, and opposite to the summit, a base, for example in the shape of an equilateral triangle. Each protrusion 203 has its summit pointing towards the outside of the film. The bases of protrusions 203 are parallel to smooth surface 201a of the screen, and the central axis of each protrusion 203 (that is, the axis running through the summit of the trihedron and through the center of its base) is orthogonal to the mean plane of the film. Thus, the three surfaces of the trihedron are oblique with respect to the mean plane of the film.

Screen 103 differs from a conventional retroreflective screen with cube corners in that, in screen 103, protrusions 203, instead of being adjacent, are separated from one another by substantially smooth areas 205 of surface 201b, parallel or approximately parallel to surface 201a of the screen.

Screen 103 is intended to be illuminated by projector 105 (FIG. 1) on its surface 201a, as schematically illustrated by arrow 207 of FIG. 2. The screen portions located opposite smooth areas 205 of surface 201a correspond to transparent portions of screen 103, giving way to light in both directions with no significant deformation. The screen portions located opposite protrusions 203 correspond to non-transparent retroreflective portions of screen 103, capable of sending towards its source light originating from projector 105. More particularly, when an incident light beam (not shown) reaches a retroreflective portion of screen 103, this beam crosses part of the screen thickness until it reaches the base of the corresponding cube corner 203, penetrates into the cube corner, is reflected on each of the three lateral surfaces of the cube corner and, after reflection on the third lateral surface, set back off towards its source. In the shown example, the reflections on the lateral surfaces of the cube corners are based on the principle of total internal reflection. As a variation, the lateral surfaces of the cube corners may be covered with a reflective material on the side of surface 201b of the screen. The reflections on the lateral surfaces of the cube corners then are mirror-type reflections.

SUMMARY

An embodiment provides a method of manufacturing a primary mold for the forming of a retroreflective screen, the method comprising the steps of: a) forming on the front surface of a first substrate comprising a front surface and a rear surface a layer of a material such that the first substrate is selectively etchable over said layer; and b) forming micro-recesses from the rear surface of the first substrate by selective etching of the first substrate over said layer, each microrecess emerging on the rear surface of said layer and having a back substantially parallel to the front surface of the first substrate and first and second lateral walls substantially orthogonal to each other and substantially orthogonal to the back, the first and second lateral walls and the back of the microrecess joining at a same point and forming a trihedron.

According to an embodiment, the method further comprises, before step a), a step of forming roughnesses on the front surface of the first substrate.

According to an embodiment, the step of forming roughnesses on the front surface of the first substrate comprises a step of grey-level lithography.

According to an embodiment, the method further comprises, after step a), a step of placing the first substrate on a second support substrate, so that the front surface of said layer faces the second substrate.

According to an embodiment, the first and second substrates are assembled by molecular bonding.

According to an embodiment, the method further comprises, between step a) and step b), a step of thinning the first substrate from its rear surface.

According to an embodiment, at step b), the microrecesses are formed by deep reactive ion etching.

According to an embodiment, the first substrate is made of silicon and said layer is made of silicon oxide.

According to an embodiment, the method further comprises a step of forming, on the rear surface side of the substrate, trenches with oblique or curved sides, each microrecess emerging into a trench.

According to an embodiment, the method comprises manufacturing a primary mold by a method such as defined hereabove, and replicating the patterns of the rear surface of the primary mold on a surface of a film, by molding from the primary mold.

Another embodiment provides a primary mold for the forming of a retroreflective screen, comprising: a first substrate comprising a front surface and a rear surface; a layer of a material such that the first substrate is selectively etchable over said layer, coating the front surface of the first substrate; and microrecesses extending from the rear surface of the first substrate, each microrecess emerging on the rear surface of said layer and having a back substantially parallel to the rear surface of the first substrate and first and second lateral walls substantially orthogonal to each other and substantially orthogonal to the back, the first and second lateral walls and the back of the microrecess joining at a same point and forming a trihedron.

Another embodiment provides a retroreflective screen comprising a first film having a surface comprising a plurality of microrecesses, each microrecess having a back substantially parallel to the mean plane of the screen and first and second lateral walls substantially orthogonal to each other and substantially orthogonal to the back, the first and second lateral walls and the back of the microrecess joining at a same point and forming a trihedron.

According to an embodiment, in each microrecess, the first and second lateral walls and the bottom of the microrecess are coated with a reflective metallization.

According to an embodiment, the surface of the first film further comprises trenches with oblique or curved sides, each microrecess emerging into one of the trenches.

According to an embodiment, the trenches are V-shaped trenches formed by machining of the surface of the first film, a plurality of microrecesses emerging into a same trench.

According to an embodiment, the first film is made of a transparent material.

According to an embodiment, the first film is made of a non-transparent material.

According to an embodiment, the screen further comprises a layer of transparent glue coating the surface of the first film, and a second film made of a transparent material coating the layer.

According to an embodiment, the surface coverage of the screen by the microrecesses is lower than 50%.

According to an embodiment, the screen comprises microrecesses having different dimensions and/or orientations in different areas of the screen.

According to an embodiment, the microrecesses are distributed according to a random or semi-random layout across the screen surface.

Another embodiment provides a method of manufacturing a retroreflective screen such as defined hereabove, comprising manufacturing a primary mold having a surface exhibiting structures of same shape as the structures of the surface of the first film of the screen.

According to an embodiment, the manufacturing of the primary mold comprises a step of etching microrecesses on the side of a first surface of a substrate, each microrecess having a bottom substantially parallel to the mean plane of the screen and first and second lateral walls substantially orthogonal to each other and substantially orthogonal to the bottom, the first and second lateral walls and the bottom of the microrecess joining at a same point and forming a trihedron.

According to an embodiment, the manufacturing of the primary mold further comprises a step of forming, on the side of the surface of the substrate, trenches with oblique or curved sides, each microrecess emerging into a trench.

According to an embodiment, the method further comprises a step of replicating the patterns of said surface of the primary mold on said surface of the first film, by molding from the primary mold.

According to an embodiment, the replication step comprises forming a secondary mold having a shape complementary to that of the primary mold, by molding from the primary mold.

Another embodiment provides a primary mold for the manufacturing of a retroreflective screen of the above-mentioned type, having a surface exhibiting structures of same shape as the structures of the surface of the first film.

The foregoing and other features and advantages will be discussed in detail in the following non-limiting description of specific embodiments in connection with the accompanying drawings.

BRIEF DESCRIPTION OF THE DRAWINGS

FIGS. 3A, 4A, 5A, 6A, 7A, 8A, and 9A are perspective views schematically illustrating successive steps of an example of a method of manufacturing an embodiment of a screen provided with retroreflective microstructures;

FIGS. 3B, 4B, 5B, 6B, 7B, 8B and 9B are cross-section views of the structures of FIGS. 3A, 4A, 5A, 6A, 7A, 8A and 9A, respectively;

DETAILED DESCRIPTION

Figure 1:
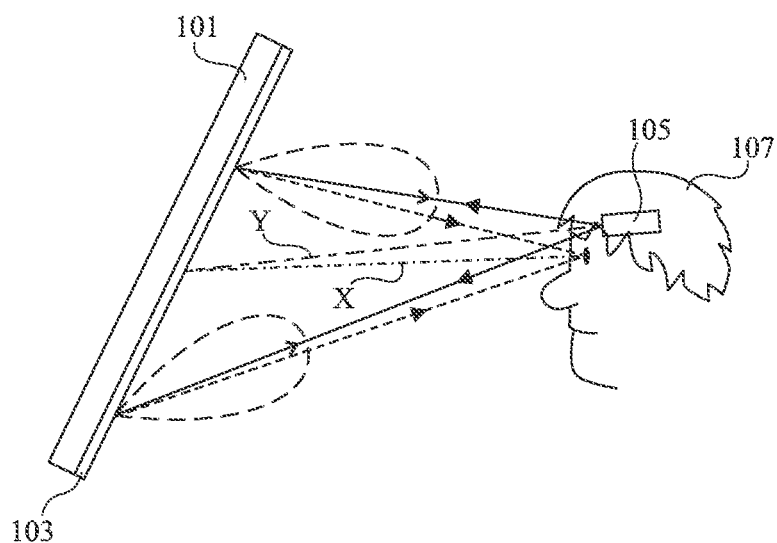
FIG. 1, previously described, is a cross-section view schematically showing an example of a system for displaying an image on a windshield.

The same elements have been designated with the same reference numerals in the different drawings and, further, the various drawings are not to scale. In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the corresponding cross-section views, it being understood that, in practice, the described devices may be oriented differently. Unless otherwise specified, expressions "approximately", "about", "substantially", and "in the order of" mean to within 10%, preferably to within 1%, or, when angular or the like values are concerned (for example, orientation qualifiers such as terms parallel, orthogonal, vertical, horizontal, etc.), to within 1 degree, preferably to within 0.1°.

Figure 2:
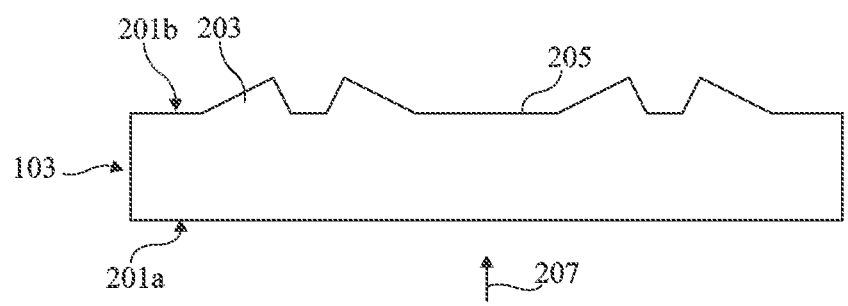
FIG. 2, previously described, is a cross-section view showing in further detail a screen of the system of FIG. 1.

A limitation of screen 103 of FIG. 2 is that its retrore-flection efficiency, which is very good for angles of incidence of the projected beam close to the normal to the screen, for example, for angles of incidence in the range from 0 to 20 degrees, strongly drops when the angle of incidence of the projected beam increases. As an illustration, measurements of the intensity of the retroreflected beam have been performed on a screen of the type described in relation with FIG. 2 for different angles of the incident beam. Such measurements show that the intensity of the retrore-flected beam is maximum for a zero angle of incidence (normal incidence), that it drops to approximately 50% of its maximum value for a 25° angle of incidence, and that it falls to 10% of its maximum value for a 50° angle of incidence.

This may be a problem for the application to the projection of an image on a vehicle windshield. Indeed, in many vehicles, the windshield is strongly inclined with respect to the vertical direction. Further, in a system of the type described in relation with FIG. 1, projector 105 assembled on the user's head may have its main projection axis inclined downwards with respect to the horizontal direction. Thus, the angle formed between the main axis of projector 105 and screen 103 coating the windshield may reach high values, for example, in the range from 50 to 70 degrees. At such angles of incidence, the retroreflection efficiency of screen 103 of FIG. 2 is relatively low.

Another limitation of screen 103 of FIG. 2 is its high manufacturing complexity, particularly due to the fact that retroreflective protrusions 203 have oblique surfaces (with respect to the mean plane of the screen) having inclination angles which should be very accurately controlled to obtain the desired retroreflective effect.

FIGS. 3A, 3B, 4A, 4B, 5A, 5B, 6A, 6B, 7A, 7B, 8A, 8B, 9A and 9B schematically illustrate steps of a method of manufacturing an embodiment of a screen 400 provided with retroreflective microstructures, compatible with a system of the type described in relation with FIG. 1. FIGS. 3A, 4A, 5A, 6A, 7A, 8A and 9A are perspective views, and FIGS. 3B, 4B, 5B, 6B, 7B, 8B and 9B are cross-section views along plane B-B of FIGS. 3A, 4A, 5A, 6A, 7A, 8A and 9A, respectively.

FIGS. 3A, 3B, 4A, 4B, 5A and 5B illustrates steps of manufacturing of a primary mold 320 (FIGS. 5A and 5B) intended to be used on manufacturing of the actual screen 400.

FIGS. 3A and 3B illustrate a step of arranging a mask 303 on the upper surface of a substrate 301 where primary mold 320 is desired to be formed. Substrate 301 is for example made of glass, of silicon, of a thermoplastic polymer such as polymethyl methacrylate or PMMA or of any other adapted material. The upper surface of substrate 301 is preferably planar. Mask 303 comprises through openings 307 exposing portions of the upper surface of substrate 301 intended to be etched in a subsequent step. Mask 303 is made of a material capable of protecting the non-exposed portions of substrate 301 during the subsequent etch step. As an example, mask 303 is made of metal or of resin. In top view, each opening 307 formed in mask 303 comprises two lateral walls 308a and 308b substantially orthogonal to each other, joining to form an angle of approximately 90 degrees. Each opening 307 for example has, in top view, the shape of a convex pentagon. In the shown example, each opening 307 has, in top view, the shape of a right-angled isosceles triangle having a trapezoid juxtaposed thereto. The sides of the right-angled triangle correspond to lateral walls 308a and 308b, and the base of the right-angled triangle is confounded with a base (the large base in the shown example) of the trapezoid. Openings 307 are for example all substantially identical and substantially oriented in the same way. In the shown example, only two openings 307 have been shown for simplification. In practice, a large number of openings 307 may be provided. As an example, openings 307 are regularly distributed across the entire upper surface of substrate 301. Openings 307 are for example arranged in an array of rows and columns.

FIGS. 4A and 4B illustrate a step of forming cavities or recesses 311 extending substantially vertically in substrate 301, from its upper surface, opposite openings 307 of mask 303. Each cavity 311 comprises lateral walls substantially orthogonal to the upper surface of substrate 301, and a bottom substantially orthogonal to the upper surface of the substrate. In particular, each cavity comprises two lateral walls 312a and 312b substantially orthogonal to each other, substantially coinciding, in top view, with lateral walls 308a and 308b of openings 307. Lateral walls 312a and 312b and bottom 312c of each cavity 311 joining at a same point S, and defining a cube corner having point S as a summit. In each cavity 311, the axis of symmetry or central axis of the cube corner of summit S forms, by construction, an angle of approximately 54.74 degrees with the upper surface of substrate 301.

As will be explained in further detail hereafter, in each cavity 311, the cube corner of summit S corresponds to a retroreflective microrecess of the future screen 400. Lateral wall 312d of each cavity 311 opposite to summit S (corresponding to the small base of the trapezoid of opening 307 in the shown example) is preferably relatively distant from summit S, to define in cavity 311 a clearance region opposite the base of the cube corner. As an example, in top view, cavity 311 has, in the direction of the bisectrix of the angle formed by lateral walls 312a and 312b, a dimension in the range from 1 to 1.5 time the cavity depth. Cavities 311 for example have a depth in the range from 20 to 500 µm and preferably in the range from 50 to 200 µm.

Cavities 311 are for example formed by a deep reactive ion etching method, generally called DRIE in the art. Such a method has the advantage of enabling to easily form cavities having substantially vertical lateral surfaces down to relatively large depths, and a substantially horizontal bottom. Any other adapted etch method may however be used, for example, a laser etching or an X-ray etching.

Once the etching has been performed, mask 303 (not shown in FIGS. 4A and 4B) is removed.

FIGS. 5A and 5B illustrate a step of forming trenches or recesses 314 with oblique or curved sides in substrate 301, from the upper surface of the substrate. Trenches 314 have a depth smaller than the thickness of substrate 301. Trenches 314 cross the clearance regions of cavities 311, while avoiding the cube corner regions corresponding to the retro-reflective microrecesses of screen 400. Preferably, a same trench 314 crosses a plurality of cavities 311. As an example, in top view, each trench 314 thoroughly crosses substrate 301 in a direction of alignment of cavities 311 which do not cross the cube corner portions of cavities 311. As a variation, a local trench 314 is formed at the level of each cavity 311, that is, each trench 314 crosses a single cavity 311.

Trenches 314 have a depth greater than or equal to that of cavities 311, for example, a depth in the range from 1 to 1.5 time the depth of cavities 311. Trenches 314 preferably have a longitudinal plane of symmetry substantially orthogonal to the upper surface of the substrate. The depth of trenches 314, their width, and the inclination of their sides are selected to remove all or part of the vertical walls of cavities 311 which do not correspond to the retroreflective cube corner regions of screen 400.

As an example, trenches 314 are V-shaped trenches. V-shaped trenches may for example be obtained by machining of the substrate by means of a saw, or by etching. The V-shaped trenches for example have an angular aperture in the range from 20 to 60 degrees, and preferably in the order of 50 degrees.

As a variation, trenches 314 are trenches with curved sides, for example, C-shaped trenches. Such trenches may for example be formed by etching.

The provision of trenches 314 enables to ease a subsequent step of unmolding an element of screen 400 formed from mold 320. It should however be noted that trenches 314 are optional, and may in particular be omitted if no specific unmolding difficulty arises during this subsequent step. It should further be noted that the angle of inclination of trenches 314 does not need to be accurately controlled, since trenches 314 are only used to ease the unmolding of the screen, but have no optical function in the final screen. The structure obtained at the end of steps 3A, 3B, 4A, 4B, 5A, 5B corresponds to primary mold 320.

FIGS. 6A and 6B illustrate a step during which the structures of the upper surface of primary mold 320 are replicated, by molding, on a surface (the upper surface in the shown example) of a film 351. As an example, film 351 is made of a plastic material, for example, of polymethyl methacrylate type. In this example, film 351 is made of a transparent material. The replication of the patterns of primary mold 320 of a surface of film 351 requires forming, from primary mold 320, a secondary mold (not shown) having a shape complementary to that of primary mold 320. The structures of the upper surface of film 351 are then obtained, from the secondary mold, by thermoforming or by any other adapted molding technique. For simplification, in the following description, references 311, 312a, 312b, 312c, 312d, S and 314 used to designate elements of the structures of the upper surface of primary mold 320, will be used to designate the corresponding elements of the structures of the upper surface of film 351. The non-structured surface of film 351, that is, its lower surface in the shown example, is preferably substantially planar.

FIGS. 7A and 7B illustrate a step of arranging a mask 353 on the upper surface of film 351. Mask 353 comprises through openings 355 exposing portions of the upper surface of film 351. More particularly, openings 355 are substantially arranged opposite the cube corners of summit S corresponding to the retroreflective microrecesses of screen 400. The rest of the upper surface of film 351, and particularly the planar portions of the upper surface of film 351 which are not occupied by cavities 311 and trenches 314, as well as the portions of the upper surface of film 351 corresponding to trenches 314 and to the clearance regions of cavities 311, are covered with mask 353.

FIGS. 8A and 8B illustrate the result of a step of depositing, through openings 355 or mask 353, reflective metallizations 357 coating the lateral walls and the bottom of the cube corner microrecesses of the upper surface of film 351. Metallizations 357 are for example made of aluminum. Metallizations 357 may be deposited by spraying through the mask openings. In practice, metallizations 357 may extend on the upper surface of film 351 slightly beyond the limit of the cube corners of summit S. As an example, in top view, each metallization 357 may have the shape of a substantially circular disk having the right-angled triangle inscribed therein corresponding, in top view, to the cube corner recess coated with metallization 357.

Once metallizations 357 have been deposited, mask 353 is removed.

Figure 9A:
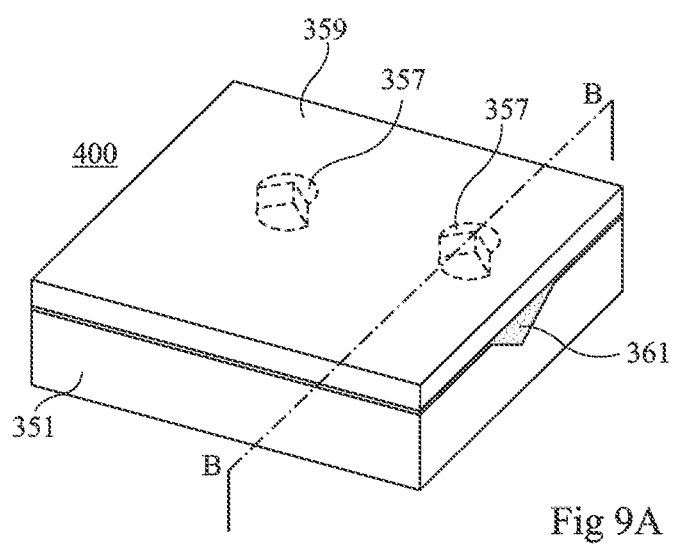
Figure 9B:
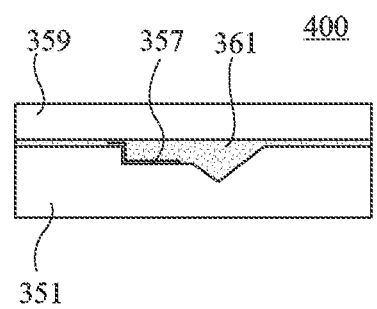

FIGS. 9A and 9B illustrate a step of bonding a transparent coating film 359 to the upper surface of film 351. In this example, the surfaces of film 359 are substantially planar. A transparent glue layer 361 filling, in particular, cavities 311 and trenches 314 of the upper surface of film 351, forms an interface between the upper surface of film 351 and the lower surface of film 359. Preferably, coating film 359 and transparent glue 361 have substantially the same refraction index as film 351. Coating film 359 and transparent glue layer 361 enable to guarantee a good transparency of screen 400 outside of the areas coated with metallizations 357. The assembly thus obtained forms screen 400.

Screen 400 has retroreflective portions regularly distributed across its entire surface, corresponding to the metallized cube corner structures of film 351. Each retroreflective screen is surrounded with a transparent screen portion, so that the screen is partially retroreflective and partially transparent. Screen 400 is thus adapted to an operation of the type described in relation with FIG. 1 (with the upper surface of the screen facing projector 105). To obtain a good transparency of screen 400 enabling to visualize an outer scene, the surface coverage of screen 400 by the retroreflective portions is for example smaller than 50% and preferably smaller than 20%.

When they penetrate into screen 400 through the upper surface of film 359, the incident rays are deviated by an angle which depends on the optical index of film 359. The maximum retroreflection efficiency of the cube corner structures of screen 400 is in principle obtained when the rays projected on the structures are parallel to the central axis of the cube corners of summit S, that is, when the rays propagating inside of the screen are inclined by approximately 54.74 degrees with respect to the mean plane of the screen. Such an inclination of the rays within the screen can generally not be obtained in practice, since this inclination is greater than the limiting refraction angle of the upper diopter of the screen. As an example, for a film 359 having an optical index in the order of 1.5, the limiting refraction angle is approximately 42 degrees. It should further be noted that the higher the angle of incidence of the light rays on screen 400, the more significant the losses by reflection on the upper surface of screen 400. According to the selected materials, one may easily find, by measurement and/or simulation, the angle of incidence of the light rays for which the retroreflection efficiency of the screen is maximum. As an example, analyses have shown that, when films 359 and 351 and glue layer 361 have a refraction index in the order of 1.5, the maximum retroreflection efficiency of screen 400 is obtained for an angle of incidence (outside of the screen) in the order of 60 degrees. More generally, the studies which have been carried out show that the provided structure provides a good retroreflection efficiency for angles of incidence in the range from 30 to 80 degrees, and preferably in the range from 50 to 70 degrees. Thus, screen 400 is well adapted to the application to the projection of an image on a vehicle windshield.

Another advantage of screen 400 is that it is relatively simple to form, due to the fact that the cube corner microrecesses forming the retroreflective portions of the screen comprise no oblique surfaces with respect to the mean plane of the screen. The surfaces of the cube corner microrecesses of screen 400 are substantially orthogonal or parallel to the mean plane of the screen. Thus, the cube corner microrecesses may be obtained by means of a simple etching with vertical sides from the upper surface of substrate 301.

As a variation, at the step of FIGS. 6A and 6B, instead of replicating by molding the structures of the upper surface of primary mold 320 on the upper surface of film 351, it may be provided to form by molding, on the upper surface of film 351, structures complementary to those of the upper surface of primary mold 320. To achieve this, one may for example form from the secondary mold (not shown) a tertiary mold (not shown) having structures identical or similar to those of primary mold 320. The tertiary mold can then be used to form by molding the structures of the upper surface of film 351. The rest of the method of manufacturing display 400 is then substantially identical to what has been described hereabove, to within a few adjustments which are within the abilities of those skilled in the art. The obtained screen 400 then no longer comprises cube-corner retroreflective recesses, but comprises cube-corner retroreflective protrusions. In this variation, screen 400 is intended to be illuminated via its rear surface.

Specific embodiments have been described. Various alterations, modifications, and improvements will occur to those skilled in the art. In particular, the described embodiments are not limited to the above-mentioned example where the cube corner microrecesses forming the retroreflective portions of screen 400 are substantially identical and oriented in the same way. In practice, according to the needs of the application, cube corner microrecesses may have different dimensions and/or different orientations (in top view) in different areas of the screen.

Further, the cube corner microrecesses forming the retroreflective portions of screen 400 are not necessarily aligned in rows and in columns, but may have a random or semi-random distribution on the screen surface, particularly to avoid possible diffraction phenomena capable of occurring under certain angles of incidence when the microrecesses are regularly arranged.

Further, the described embodiments are not limited to the example of a method of manufacturing reflective metallizations 357 described in relation with FIGS. 7A, 7B, 8A, 8B. As a variation, the step of forming mask 353 described in relation with FIGS. 7A and 7B may be omitted. Instead, a conformal metal layer coating the entire upper surface of the structure of FIGS. 6A and 6B may be formed. The deposited metal can then be removed from the upper planar regions of the structure (corresponding to the transparent areas of the screen), for example, by chem.-mech. polishing. During this step, only the portions of the metal layer coating the walls of cavities 311 and, possibly, of trenches 314, are kept, forming reflective metallizations 357.

It should further be noted that in an application of the type described in relation with FIG. 1, light source 105 is generally not placed exactly in the axis of the user's viewing angle. Thus, screen 400 should preferably be capable of diffusing the retroreflected light in a diffusion cone encompassing the user's pupil, so that the user can see the image displayed by the projector. In practice, the inventors have observed that diffraction effects on the edges of the microrecesses and/or unavoidable surface imperfections of the screen may be sufficient to obtain the required diffusion effect. To amplify and/or control such a diffusion, the roughness of the sides and of the bottom of cavity 311 of primary mold 320 may for example be varied.

Further, the described embodiments are not limited to the application to the projection of an image on a transparent surface. In particular, the described embodiments may have applications in various fields using retroreflective surfaces, not necessarily transparent, for example, for signaling purposes. In certain cases, it may indeed be desirable to have a surface with a good retroreflection efficiency for high angles of incidence. As an example, such a surface may be useful for ground signaling applications in the field of roads for motor vehicles. In the case where the transparency is not desired, it will preferably be desired to maximize the screen surface coverage by the cube corner retroreflective portions. Further, the material of film 351 may be non-transparent. Coating film 359 and intermediate glue layer 361 should however be transparent to allow the incident light to reach cube corner metallizations 357 and then to come out of the screen after being reflected on the metallization surfaces. As a variation, coating film 359 and intermediate glue layer 361 may be omitted. Further, although the screen transparency is not required, reflective metallizations 357 are not necessarily located on the cube corner portions of substrate 351, but may form a continuous layer formed by conformal deposition and coating the entire upper surface of substrate 351.

It should be noted that in the present description, term film has been used to designate elements 351 and 359 of screen 400. This term should however be understood in a wide sense, and particularly includes elements similar to films such as sheets, plates, etc.

FIGS. 10A, 10B, 10C, and 10D are cross-section views schematically illustrating an alternative embodiment of the method of FIGS. 3A, 3B, 4A, 4B, 5A, 5B, 6A, 6B, 7A, 7B, 8A, 8B and 9A, 9B. The method of FIGS. 10A, 10B, 10C, and 10D differs from the method of FIGS. 3A, 3B, 4A, 4B, 5A, 5B, 6A, 6B, 7A, 7B, 8A, 8B, and 9A, 9B essentially in the steps of manufacturing the primary mold used to form the retroreflective screen.

Figure 10A:
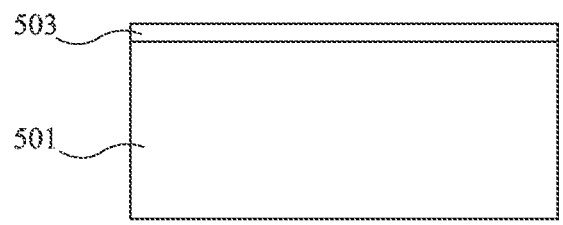
FIGS. 10A, 10B, 10C, and 10D are cross-section views schematically illustrating an alternative embodiment of the method of FIGS. 3A, 3B, 4A, 4B, 5A, 5B, 6A, 6B, 7A, 7B, 8A, 8B and 9A, 9B.

FIG. 10A illustrates an initial step of forming, on top of and in contact with the front surface of a first substrate 501 comprising a front surface (the upper surface in the orientation of FIG. 10A) and a rear surface (the lower surface in the orientation of FIG. 10A), a layer 503 of a material such that substrate 501 is selectively etchable over layer 503. The front surface of substrate 501 is preferably planar. As an example, substrate 501 is made of silicon and layer 503 is made of silicon oxide. Layer 503 is for example formed by oxidation of the upper surface of substrate 501.

Figure 10B:
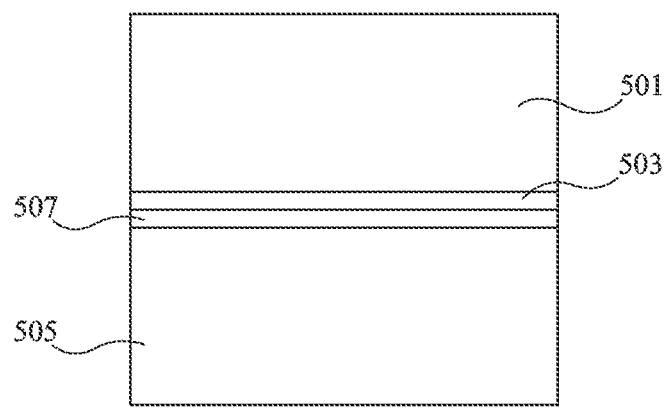

FIG. 10B illustrates a step subsequent to the forming of layer 503, during which first substrate 501 is placed on a second substrate or support substrate 505, so that the front surface of layer 503, that is, the surface of layer 503 opposite to substrate 501, faces substrate 505. As an example, substrate 505 is a silicon substrate identical or similar to substrate 501, and substrate 505 is coated, on its front surface side (the upper surface in the orientation of FIG. 10B), with a silicon oxide layer 507 identical or similar to layer 503. During the placing step of FIG. 10B, the front surface of layer 503 is placed into contact with the front surface of layer 507. In this example, the respective front surfaces of silicon oxide layers 503 and 507 are previously surface-treated to obtain a molecular bonding of the two layers when they are placed in contact. The described embodiments are however not limited to this specific case. As a variation, support substrate 505 may be of a different nature than substrate 501. Further, support substrate 505 is not necessarily coated with a layer of same nature as layer 503. Further, the bonding of substrates 501 and 505 may be performed by a technique other than molecular bonding.

Figure 10C:
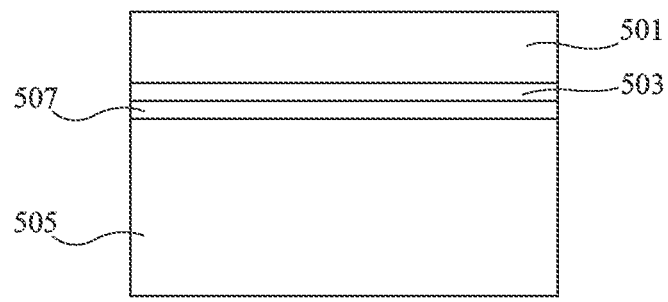

FIG. 10C illustrates a step subsequent to the step of placing substrate 501 on substrate 505, during which substrate 501 is thinned from its rear surface (that is, its upper surface in the orientation of FIG. 10C). The thinning for example comprises a step of grinding the rear surface of substrate 501, followed by a planarization step, for example, a chem.-mech. polishing. More generally, any other known thinning method may be used. As a variation, the thinning may comprise a cleavage step, followed by a planarization step. In this case, a previous ion implantation step may be provided to define the cleavage area. If the thickness of substrate 501 remaining above layer 503 at the end of the cleavage step is insufficient, a step of deposition or of growth of a layer of the substrate material on the rear surface of substrate 501 may be provided after the cleavage step.

At the end of the thinning step, the rear surface of substrate 501 is preferably substantially planar and parallel to the front surface of substrate 501.

The thickness of substrate 501 remaining above layer 503 at the end of the thinning step is equal to the depth of the cube-corner cavities or recesses 311 of the primary mold which is desired to be formed. As an example, the thickness of substrate 501 remaining above layer 503 is in the range from 20 to 500 µm and preferably in the range from 50 to 200 µm.

The method of FIGS. 3A, 3B, 4A, 4B, 5A, 5B, 6A, 6B, 7A, 7B, 8A, 8B, and 9A, 9B is then implemented identically or similarly to what has been described hereabove, provided to replace substrate 301 with the assembly formed by thinned substrate 501, layer 503, support substrate 505, and layer 507. For the implementation of this method, the rear surface of thinned substrate 501 substitutes to the upper surface of substrate 301.

Figure 10D:
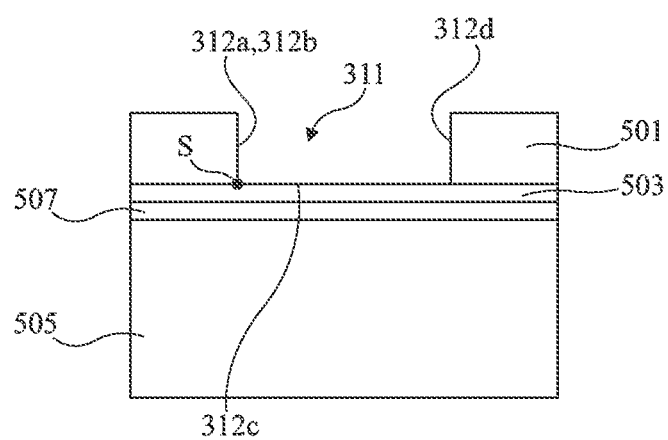

FIG. 10D illustrates the step of forming cavities or recesses 311 of the primary mold, extending substantially vertically into substrate 501, from the rear surface thereof. This step corresponds to the step described hereabove in relation with FIGS. 4A and 4B. In the method of FIGS. 10A to 10D, the etch method used to form cavities 311 is selected to selectively etch the substrate over the material of layer 503. As an example, cavities 311 are formed by deep reactive ion etching (DRIE). Layer 503 forms an etch stop layer, that is, the etching of cavities 311 stops on the rear surface of layer 503. Thus, back 312c of each cavity 311 is formed by the rear surface of layer 503.

The other steps of the method of manufacturing primary mold 320 and then of the method of manufacturing retroreflective screen 400 from primary mold 320, are identical or similar to what has been described in relation with FIGS. 3A, 3B, 4A, 4B, 5A, 5B, 6A, 6B, 7A, 7B, 8A, 8B, and 9A, 9B.

An advantage of the method of FIGS. 10A to 10D lies in the fact that the presence of etch stop layer 503 enables to guarantee a good planeness of back 312c of cavities 311. In particular, back 312c of each cavity 311 remains planar up to summit S of the cube corner, so that the right angle obtained between back 312c and lateral surfaces 312a, 312b of each cavity 311 is sharp (not rounded). This enables to improve the retro-reflection performance of the final screen with respect to the method of FIGS. 3A, 3B, 4A, 4B, 5A, 5B, 6A, 6B, 7A, 7B, 8A, 8B, and 9A, 9B, where the angle between back 312c and lateral walls 312a, 312b of each cavity 311 is capable of being slightly rounded.

FIGS. 11A, 11B, 11C, 11D, 11E, 11F, and 11G are cross-section views schematically illustrating another alternative embodiment of the method of FIGS. 3A, 3B, 4A, 4B, 5A, 5B, 6A, 6B, 7A, 7B, 8A, 8B, and 9A, 9B.

The method of FIGS. 11A to 11G has similarities with the method of FIGS. 10A to 10D, and takes advantage of the presence of etch stop layer 503 to form roughnesses on back 312c of cavities 311 of the primary mold, to introduce a function of controlled diffusion of the light retroreflected by the screen, so that the user can see the image displayed by the projector even when light source 105 is not exactly placed in the user's line of sight. Such a controlled diffusion is particularly advantageous in systems where the projector is dissociated from the user, for example, when the projector is attached to the vehicle rather than to the user.

Figure 11A:
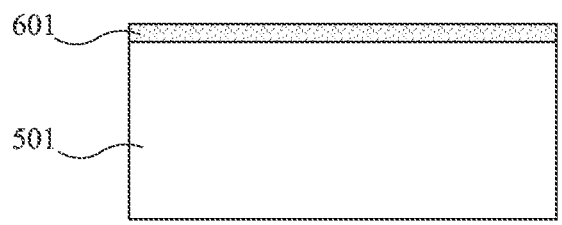
FIGS. 11A, 11B, 11C, 11D, 11E, 11F, and 11G are cross-section views schematically illustrating another alternative embodiment of the method of FIGS. 3A, 3B, 4A, 4B, 5A, 5B, 6A, 6B, 7A, 7B, 8A, 8B and 9A, 9B.
Figure 11B:
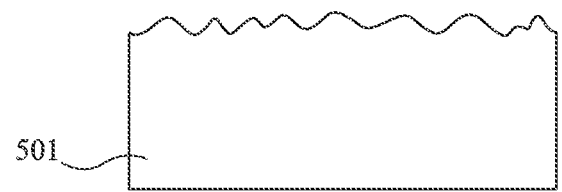

FIGS. 11A and 11B illustrate an initial step of forming roughnesses on the front surface of substrate 501, before the deposition of layer 503. To achieve this, in the shown example, it is provided to deposit on the front surface of substrate 501 a resist layer 601 (FIG. 11A), where the desired roughness pattern is formed by a grey-level lithography step. The structures (not shown in FIG. 11A) of resin layer 601 are then transferred by etching onto the upper surface of substrate 501 (FIG. 11B). More generally, any other method enabling to structure the upper surface of substrate 501 to obtain the desired diffusion function may be used. Examples of roughness patterns allowing a controlled diffusion of light are for example described in U.S. Pat. No. 8,114,248. Preferably, the roughnesses formed on the front surface of substrate 501 have dimensions greater than the greatest wavelength of the light which is desired to be retroreflected.

Figure 11C:
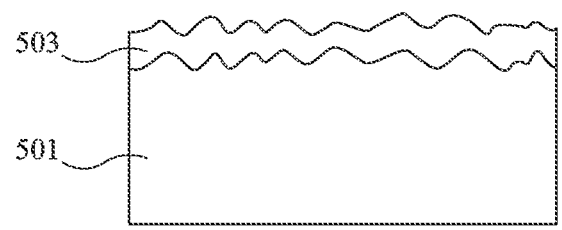

FIG. 11C illustrates a step of forming layer 503 on top of and in contact with the structured front surface of substrate 501. This step is for example identical or similar to what has been described in relation with FIG. 10A. Once layer 503 has been formed, the latter comprises on its rear surface (that is, its lower surface in the orientation of FIG. 11C) structures complementary to those of the front surface of substrate 501. It should be noted that in the case where layer 503 is formed by oxidation of the front surface of substrate 501, the roughnesses previously formed on the front surface of substrate 501 may be deformed by the oxidation. The sizing of the roughnesses formed on the front surface of substrate 501 at the steps of FIGS. 11A and 11B may be performed by taking the deformations into account. Further, although the subsequent step of etching cavities 311 of the primary mold is carried out by a method of selective etching of substrate 501 over layer 503, this etch step may however cause a deformation of the structures of the rear surface of layer 503. Such a deformation may be taken into account in the sizing of the roughnesses formed on the front surface of substrate 501 at the steps of FIGS. 11A and 11B.

Figure 11D:
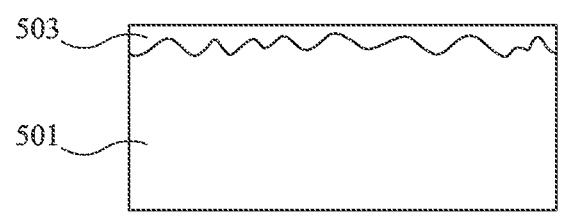

FIG. 11D illustrates a step of planarizing the front surface (that is, the upper surface in the orientation of FIG. 11D) of layer 503.

Figure 11E:
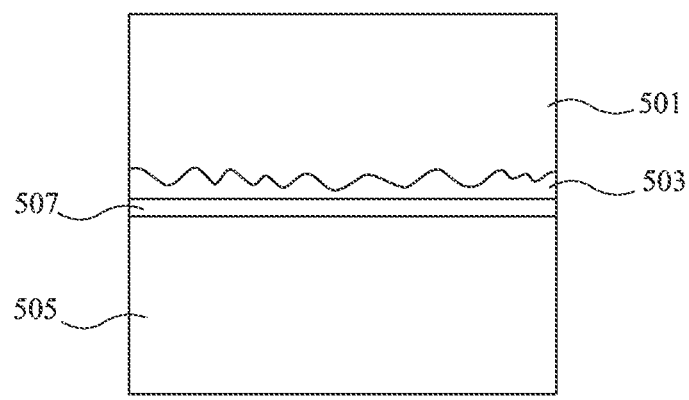

FIG. 11E illustrates a step subsequent to the forming of layer 503, during which substrate 501 is placed on a second substrate or support substrate 505, so that the front surface of layer 503, that is, the surface of layer 503 opposite to substrate 501, faces substrate 505. This step is for example identical or similar to what has been described in relation with FIG. 10B.

Figure 11F:
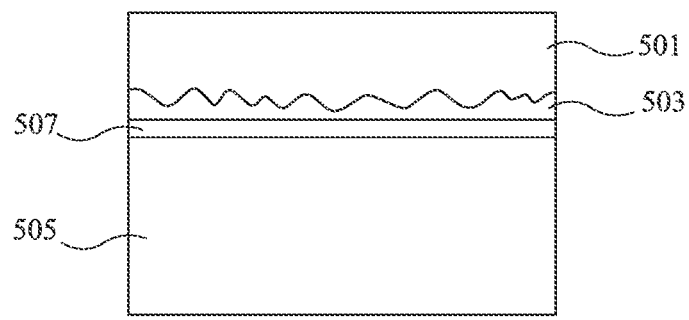

FIG. 11F illustrates a step subsequent to the step of placing substrate 501 on substrate 505, during which substrate 501 is thinned from its rear surface. This step is for example identical or similar to what has been described in relation with FIG. 10C.

The method of FIGS. 3A, 3B, 4A, 4B, 5A, 5B, 6A, 6B, 7A, 7B, 8A, 8B and 9A, 9B is then implemented identically or similarly to what has been described hereabove, by replacing substrate 301 with the assembly obtained at the end of the step of FIG. 11F. For the implementation of this method, the rear surface of thinned substrate 501 substitutes to the upper surface of substrate 301.

Figure 11G:
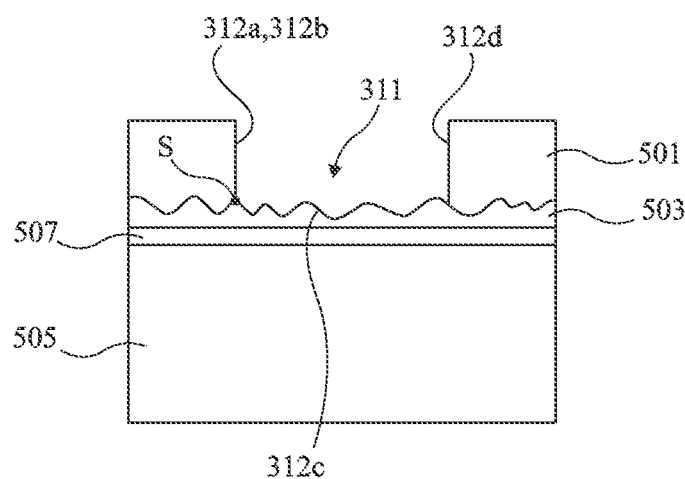

FIG. 11G illustrates the step of forming cavities or recesses 311 of the primary mold, extending substantially vertically into substrate 501, from the rear surface thereof. This step is for example identical or similar to what has been described in relation with FIG. 10D.

The other steps of the method of manufacturing primary mold 320 and then of the method of manufacturing retroreflective screen 400 from primary mold 320, are identical or similar to what has been described hereabove and will not be detailed again.

An advantage of the method of FIGS. 11A to 11G is that it enables, in a relatively simple way, to form, in the cube-corner areas of cavities 311 of primary mold 320, corresponding to the retroreflective portions of screen 400, structures capable of increasing the aperture of the retroreflected light scattering cone.

It should be noted that in the examples of a primary mold manufacturing method of FIGS. 10A to 10D and 11A to 11G, the step of thinning substrate 501 from its rear surface may be omitted if the thickness of substrate 501 is already equal to the depth of the cube-corner cavities or recesses 311 which are desired to be formed.

In the examples of FIGS. 10A to 10D and 11A to 11G, support substrate 505 having substrate 501 placed thereon and etch stop layer 503 has the function of ensuring the mechanical resistance of the assembly having the primary mold formed therefrom. In particular, support substrate 505 is necessary when the primary mold comprises unmolding trenches 314 thoroughly crossing the substrate as described in relation with FIGS. 5A and 5B. Indeed, trenches 314 being deeper than cavities 311, the forming of trenches 314 amounts to cutting substrate 501 into disjoint strips. In the absence of support substrate 505, substrate strips 501 would separate from one another.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of manufacturing a primary mold for the forming of a retroreflective screen, the method comprising the steps of:

a) forming, on the front surface of a first substrate comprising a front surface and a rear surface, a layer of a material such that the first substrate is selectively etchable over said layer; and b) forming microrecesses from the rear surface of the first substrate by selective etching of the first substrate over said layer, each microrecess emerging on the rear surface of said layer and having a back substantially parallel to the front surface of the first substrate and first and second lateral walls substantially orthogonal to each other and substantially orthogonal to the back, the first and second lateral walls and the back of the microrecess joining at a same point and forming a trihedron.

2. The method of claim 1, further comprising, before step a), a step of forming roughnesses on the front surface of the first substrate.

3. The method of claim 2, wherein the step of forming roughnesses on the front surface of the first substrate comprises a step of grey-level lithography.

4. The method of claim 1, further comprising, after step a), a step of placing the first substrate on a second support substrate, so that the front surface of said layer faces the second substrate.

5. The method of claim 4, wherein the first and second substrates are assembled by molecular bonding.

6. The method of claim 1, further comprising, between step a) and step b), a step of thinning the first substrate from its rear surface.

7. The method of claim 1, wherein at step b), the microrecesses are formed by deep reactive ion etching.

8. The method of claim 1, wherein the first substrate is made of silicon and wherein said layer is made of silicon oxide.

9. The method of claim 1, further comprising a step of forming, on the rear surface side of the substrate, trenches with oblique or curved sides, each microrecess emerging into a trench.

10. A method of manufacturing a retroreflective screen, comprising manufacturing a primary mold by the method of claim 1, and replicating the patterns of the rear surface of the primary mold on a surface of a film, by molding from the primary mold.

* * * * *